US006151398A

United States Patent [19]

Norris

[11] Patent Number: 6,151,398

[45] Date of Patent: Nov. 21, 2000

[54] MAGNETIC FILM ULTRASONIC EMITTER

[75] Inventor: Elwood G. Norris, Poway, Calif.

[73] Assignee: American Technology Corporation, San Diego, Calif.

[21] Appl. No.: 09/006,134

[22] Filed: Jan. 13, 1998

[51] Int. Cl.$^{7}$ ....... H04B 3/00

[52] U.S. Cl. ....... 381/77; 381/400; 381/410; 381/192; 367/140

[58] Field of Search ....... 381/77, 400, 401, 381/192, 396; 367/140, 132, 133, 153

[56] References Cited

U.S. PATENT DOCUMENTS

| | | | |
|---|---|---|---|
| 4,295,214 | 10/1981 | Thompson | 367/140 |
| 4,480,155 | 10/1984 | Winey | 381/408 |
| 4,593,567 | 6/1986 | Isselstrein et al. | 73/643 |
| 4,803,733 | 2/1989 | Carver et al. | 381/408 |
| 4,837,838 | 6/1989 | Thigpen et al. | 381/408 |
| 4,903,703 | 2/1990 | Igarashi et al. | 381/77 |
| 4,908,805 | 3/1990 | Sprenkels et al. | 367/181 |
| 4,939,784 | 7/1990 | Bruney | 381/408 |
| 5,115,672 | 5/1992 | McShane et al. | 73/596 |
| 5,357,578 | 10/1994 | Tanishi | 381/354 |
| 5,430,805 | 7/1995 | Stevenson et al. | 381/408 |
| 5,487,114 | 1/1996 | Dihn | 381/192 |
| 5,859,915 | 1/1999 | Norris | 381/75 |
| 5,885,129 | 3/1999 | Norris | 446/405 |
| 5,889,870 | 3/1999 | Norris | 381/77 |

OTHER PUBLICATIONS

Masahide Yoneyama, Jun–ichiroh Fujimoto, Yu Kawamo, Shoichi Sasabe "Audio Spotlight: An Application of Nonlinear Interaction of Sound Waves to a New Type of Loudspeaker Design" J. Acoustical Society of America 73(5), May 1983, pp. 1532–1536.

H.O. Berktay, T.G. Muir "Arrays of Parametric Receiving Arrays" The Journal of the Acoustical society of America, pp. 1377–1383.

Kenichi Aoki, Tomoo Kamakura, Yoshiro Kumamoto "Parametric Loudspeaker—Characteristics of Acoustic Field and Suitable Modulation of Carrier Ultrasound" Electronics and Communications in Japan, Part 3, vol. 74, No. 9, 1991, pp. 76–80.

*Primary Examiner*—Curtis A. Kuntz
*Assistant Examiner*—Phylesha Dabney
*Attorney, Agent, or Firm*—Thorpe, North & Western

[57] ABSTRACT

An ultrasonic emitter device having broad frequency range capacity with relatively large diaphragm displacement compared to typical electrostatic diaphragm movement. The device includes a core member able to establish a first magnetic field adjacent the core member and a movable diaphragm stretched along the core member and displaced a short separation distance within a strong portion of the magnetic field. At least one, low mass, planar, conductive coil is disposed on the movable diaphragm and includes first and second contacts for enabling current flow through the coil. A variable current flow to the at least one coil provides a second magnetic field which variably interacts with the first magnetic field to attract and repel the diaphragm at a desired frequency for development of a series of compression waves which may be adjusted to include an ultrasonic frequency range.

28 Claims, 4 Drawing Sheets

MAGNETIC FILM ULTRASONIC EMITTER

BACKGROUND OF THE INVENTION

1. Field of the Invention

This invention pertains to propagation of ultrasonic frequencies from a thin diaphragm emitter. Specifically, the present invention relates to a device and method for indirectly generating a new sonic or subsonic compression wave by interaction of two ultrasonic signals having frequencies whose difference in value corresponds to the desired new sonic or subsonic compression wave frequencies.

2. State of the Art

Many attempts have been made to reproduce sound in its pure form. In a related patent application under serial number 08/684,311, a detailed background of prior art in speaker technology using conventional speakers having radiating elements was reviewed and is hereby incorporated by reference. FIG. 1 illustrates a graphic representation of a conventional audio speaker 10 using a moveable diaphragm 14. Diaphragm movement 18 is regulated by energy from a magnetic core which drives a stator 22 in a reciprocating manner within an annular recess of the coil. The conversion of electrical signal to sonic compression wave is developed by the variable current or voltage applied to the stator, resulting in a variable magnetic field which is attracted or repulsed with respect to the magnetic core. The diaphragm attached to the stator is displaced to mechanically reproduce the variable frequency and amplitude of the electrical signal in the form of a compression wave. Amplitude of the compression wave is primarily a function of the diameter of the diaphragm, and extent of orthogonal displacement. Physically, this corresponds to the volume of air being moved with each stroke of the speaker membrane.

The primary disadvantage with use of such conventional speakers is distortion arising from the mass of the moving diaphragm or other radiating component. Related problems arise from distortion developed by mismatch of the radiator element across the spectrum of low, medium and high range frequencies—a problem partially solved by the use of combinations of woofers, midrange and tweeter speakers.

Attempts to reproduce sound without use of a moving diaphragm include technologies embodied in parametric speakers, acoustic heterodyning, beat frequency interference and other forms of modulation of multiple frequencies to generate a new frequency. In theory, sound is developed by the interaction in air (as a nonlinear medium) of two ultrasonic frequencies whose difference in value falls within the audio range. Ideally, resulting compression waves would be projected within the air as a nonlinear medium, and would be heard as pure sound. Despite the ideal theory, general production of sound by acoustic heterodyning for practical applications has alluded the industry for over 100 years.

Specifically, a basic parametric or heterodyne speaker has not been developed which can be applied in general applications in a manner such as conventional speaker systems. Ultrasonic frequencies have comparatively small wave lengths and are generally characterized by nominal diaphragm displacement. This limited movement of the diaphragm or emitter membrane contributes to inadequate volume for the parametric output, as well as lack of extended range for projection of the resulting sonic waves generated by interference of the two ultrasonic frequencies well. It is not surprising that amplitude would be a problem in such a system where frequencies well in excess of 40,000 Hz tend to limit the excursion length for diaphragm displacement.

A brief history of development of the theoretical parametric speaker array will be helpful with respect to enhancing an appreciation for the confusion and inadequacies of prior efforts for increasing amplitude from an acoustic heterodyne system. For example, a general discussion of this technology is found in "Parametric Loudspeaker—Characteristics of Acoustic Field and Suitable Modulation of Carrier Ultrasound", Aoki, Kamadura and Kumamoto, *Electronics and Communications in Japan, Part* 3 Vol. 74, No.9 (March 1991). Although technical components and the theory of sound generation from a difference signal between two interfering ultrasonic frequencies is described, the practical realization of a commercial sound system was apparently unsuccessful. Note that this weakness in the prior art remains despite the assembly of a parametric speaker array consisting of as many as 1410 piezoelectric transducers yielding a speaker diameter of 42 cm. Virtually all prior research in the field of parametric sound has been based on the use of conventional ultrasonic transducers, typically of bimorph character. The rigid piezoelectric emitter face of such transducers has very little displacement, and is accordingly limited in amplitude.

U.S. Pat. No. 5,357,578 issued to Taniishi in October of 1994 introduced alternative solutions to the dilemma of developing a workable parametric speaker system. Hereagain, the proposed device comprises a transducer which radiates the dual ultrasonic frequencies to generate the desired audio difference signal. However, this time the dual-frequency, ultrasonic signal is propagated from a gel medium on the face of the transducer. This medium 20 "serves as a virtual acoustic source that produces the difference tone 23 whose frequency corresponds to the difference between frequencies f1 and f2." Col 4, lines 54–60. In other words, this 1994 reference abandons direct generation of the difference audio signal in air from the face of the transducer, and depends upon the nonlinearity of a gel medium to produce sound. This abrupt shift from transducer/air interface to proposed use of a gel medium reinforces the perception of apparent inoperativeness of prior art disclosures, at least for practical speaker applications.

Electrostatic emitters for ultrasonic wave generation have been applied in many areas of technology, but have equally limited diaphragm displacement. For example, ultrasonic emitters in range finder devices for cameras and distance measuring devices produce high frequencies, but with very little amplitude. U.S. Pat. No. 5,287,331 by Schindel illustrates devices which can generate extremely high frequencies up to 2 MHZ, but have an orthogonal displacement in micrometers. Because of the weakness of electrostatic forces, it is generally expected that diaphragm displacement will be nominal, as will be the resulting amplitude of ultrasonic or sonic output.

What is needed is a system that combines the substantial mechanical movement of conventional audio speakers which are magnetically driven, with the high frequency capacity of an electrostatic speaker which operates well within the ultrasonic frequency range.

OBJECTS AND SUMMARY OF THE INVENTION

It is an object of the present invention to provide a method and apparatus for indirectly emitting new sonic and subsonic waves at acceptable volume levels from a region of air without use of conventional piezoelectric transducers as the ultrasonic frequency source.

It is another object to indirectly generate at least one new sonic or subsonic wave having commercially acceptable volume levels by using a magnetically driven, thin film emitter which provides interference between at least two ultrasonic signals having different frequencies equal to the at least one new sonic or subsonic wave.

It is still another object to provide a thin film speaker diaphragm capable of developing a uniform wave front across a broad ultrasonic emitter surface.

A still further object of this invention is to provide an improved speaker diaphragm capable of generating high amplitude compression waves in response to electrical stimulation, yet which does not require a rigid diaphragm structure of a conventional audio speaker or ultrasonic transducer.

The above objects and others not specifically recited are realized through a method and apparatus for an ultrasonic emitter device having broad frequency range capacity with relatively large diaphragm displacement compared to typical electrostatic diaphragm movement. The device includes a core member able to establish a first magnetic field. A movable diaphragm is stretched along the core member and displaced a short separation distance from the core member to allow an intended range of orthogonal displacement of the diaphragm with respect to the core member and within a strong portion of the magnetic field. At least one, low mass, planar, conductive coil is disposed on the movable diaphragm and includes first and second contacts for enabling current flow through the coil. A variable current flow is applied to the coil for developing a second magnetic field which variably interacts with the first magnetic field to attract and repel the diaphragm at a desired frequency for development of a series of compression waves which may include an ultrasonic frequency range.

Other objects, features, advantages and alternative aspects of the present invention will become apparent to those skilled in the art from a consideration of the following detailed description, taken in combination with the accompanying drawings.

BRIEF DESCRIPTION THE DRAWINGS

DETAILED DESCRIPTION OF THE INVENTION

Figure 1:
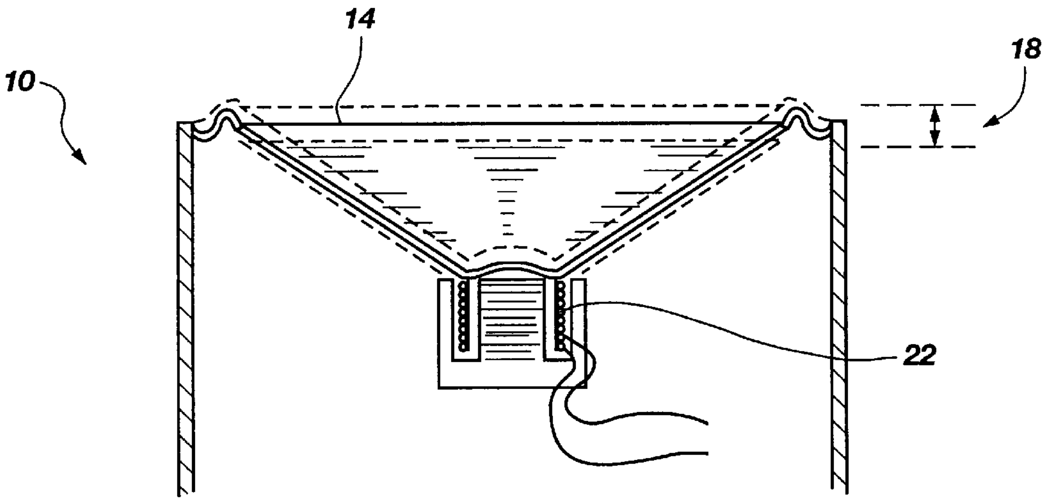
FIG. 1 is cross-sectional, side view in graphical representation of a conventional audio speaker having a magnetic core and moveable diaphragm.
Figure 2:
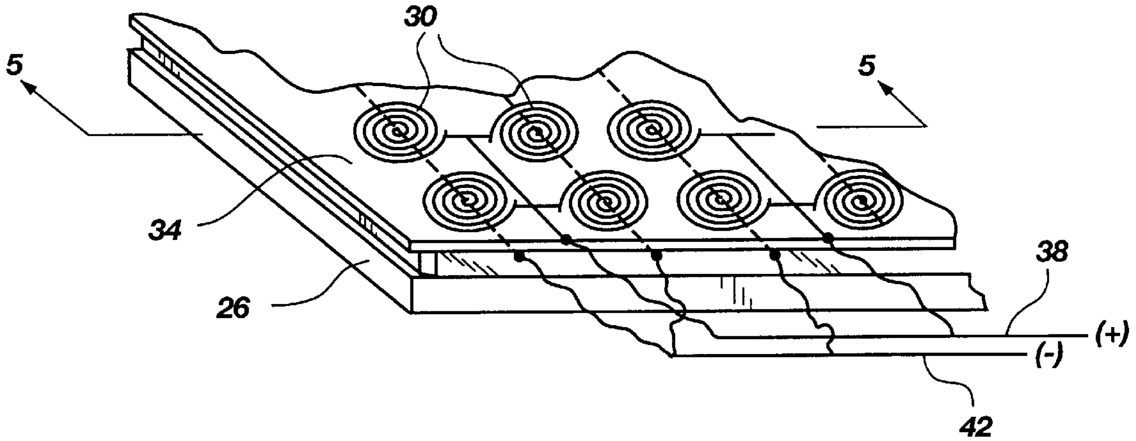
FIG. 2 is a top perspective view showing a thin film diaphragm having a plurality of magnetic coils disposed on the emitter diaphragm and suspended over a magnetic core element in accordance with the principles of the present invention.

FIG. 2 depicts one of the preferred configurations of the present invention. Specifically, it comprises an ultrasonic emitter having broad frequency range capacity with relatively large diaphragm displacement compared to the nominal movement of a typical electrostatic diaphragm. Indeed, orthogonal displacement (peak to peak movement of the diaphragm from a full extended to a full retracted position) may be as great as 0.5 mm. This compares very favorably with a movement range of 0.1 to 3 micrometers for a rigid transducer emitter face.

The benefits of extended motion for the magnetic diaphragm of the present invention include a significant increase in amplitude in ultrasonic, as well as sonic output for a parametric array. The enhanced sonic output of the present invention is enabled by use of a magnetic field generated by a magnetic core member 26. This core may be a permanent magnet or a composition adapted for electromagnetic use. Such materials may be either flexible or rigid, depending upon the configuration of the speaker array. For example, a planar plate will generate a column of sound which has surprising projection capacity over long distances. A curved emitter diaphragm may be formed and supported by a curved support core made of flexible magnet material similar to removable magnets attached to appliances, etc. This curved configuration provides a greater dispersion pattern for projected sound, and also enables a sense of directional movement to emitted sound. This can be implemented by sequentially triggering sound transmission along a linear sequence of emitter elements (or conductive coils) 30 disposed along the diaphragm 34. When these elements are radiated outward in a diverging configuration, the audience perceives the source as having a physical element of motion along that direction.

Returning to the basic embodiment of FIG. 2, it will be noted that a permanent, rigid magnetic core or plate 26 has been used as a support for the flexible emitter diaphragm 34. This permanent magnet 26 operates as the primary means for establishing a first magnetic field adjacent the core member, in a manner similar to the permanent magnet of an acoustic speaker. In this case, however, there is no telescopic core or recess which receives the stator element. Instead, the core 26 is a planar body which establishes a uniform magnetic field along its length, thereby providing necessary counter force for a variable magnetic field to be established in the diaphragm 34.

The illustrated movable diaphragm 34 is stretched along the core member 26 and displaced a short separation distance from the core member to allow an intended range of orthogonal displacement of the diaphragm with respect to the core member and within a strong portion of the magnetic field. Typically, this diaphragm 34 comprises a thin film of mylar or other strong, lightweight polymer. Many such materials are already in use in the electrostatic speaker or ultrasonic emitter industry.

The enhanced displacement of the diaphragm 34 is enabled by at least one, low mass, planar, conductive coil (or emitter element 30) disposed on the movable diaphragm. The thin conductive coil 30 creates a magnetic field when current is conducted through the coil. The present inventor has discovered that the power of a magnetic field can be implemented in a voice coil disposed on planar film, yielding the benefits of substantial diaphragm 34 displacement far beyond prior art electrostatic speaker systems. This current is supplied to the coil 30 by first and second contacts 38 and 42 which are coupled to a power source. The first contact 38 is coupled to one end of the coil 30, typically at a side common with the coil itself. The second contact 42 is disposed on the opposing side of the coil 30, thereby providing electrical isolation from the first contact 38. The illustrated embodiment shows the second contact 42 penetrating the film (or diaphragm 34) and extending along the opposite face of the film to a pick up point for closing the circuit for current flow. Other methods of electrically isolating the respective first and second contacts will be apparent to those skilled in the art.

The planar voice coil 30 may be placed on the diaphragm 34 by many procedures well known in the art. For example, multiple coil elements can be simultaneously vapor deposited on a Mylar® film with a template or mask. Similarly, the coils may be printed individually, or concurrently, with multiple print heads or plates. The reverse process can also be implemented with various etching techniques wherein the coil elements remain after metallic coating is etched from the film by laser or chemical reaction. Other forms of application or deposition may be applied in accordance with conventional methods.

Both vapor deposition and etching techniques provide very thin or fine coil elements 30 which provide the desired magnetic field. Unlike magnetic fields used in the speaker industry which utilize three dimensional coils having hundreds of wrappings of wire and adding substantial mass, the preferred embodiment of the present invention adopts a single plane for the coil, relying on spiral configuration rather than a helix to develop the coil configuration. Typical spiral patterns comprise thin line dimensions of approximately 100 micrometers, separated by open spaces or gaps of approximately 10 micrometers. This enables a coil of approximately 20 to 50 rings or spiral elements in a one inch diameter coil.

Utilization of the present invention of magnetic voice coils 30 enables the addition of very little weight to the diaphragm 34, providing a low mass speaker system capable of oscillating at high ultrasonic frequencies, yet still having substantial orthogonal displacement. Essentially, the weight of the diaphragm 34 is slightly higher than the mass of the Mylar film itself, and is therefore closely comparable therefore to an electrostatic membrane. Nevertheless, the power output of the magnetic coils greatly exceeds that of an electrostatic speaker, giving far greater amplitude to speaker output.

By supplying a variable current flow to the at least one coil 30, a second magnetic field is generated which variably interacts with the first magnetic field established in the core 26. The permanent field of the core 26 allows this first field to attract and repel the diaphragm 34 at a desired frequency for development of a series of compression waves which may be operated within an ultrasonic frequency range. Where this variable current source includes a carrier frequency which has been modulated with a voice or musical signal, a resulting dual ultrasonic frequency output is generated capable of emitting a new sonic emission in accordance with principles of acoustic heterodyning. This second magnetic field may have a field strength as much as 10 times the field strength of an electrostatic field.

Turning now to a more detailed discussion of components of the basic system, it was mentioned above that the core member 26 may comprise a permanent magnet. This permanent magnet may be a rigid plate of magnetic material having dimensions slightly larger than dimensions of an active emitting surface of the emitter device. Examples of such materials are well known to those of ordinary skill in the art, and would include a rigid, flat plate of iron or other paramagnetic material with uniform magnetic field along its surface. Alternatively, the permanent magnet may be a flexible magnetic plate or sheet similar to magnetic "stick-on" devices applied to refrigerators and other metallic appliances or surfaces.

Figure 3:
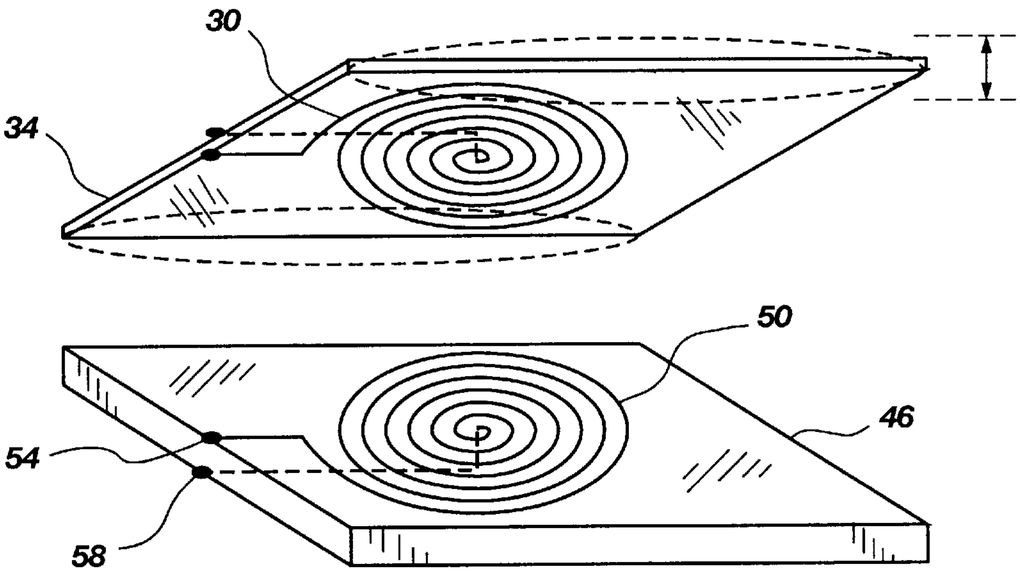
FIG. 3 is an exploded view of an alternate embodiment showing opposing magnetic coils on the emitter diaphragm and core.

As shown in FIG. 3, a further alternate embodiment of the core member 26 could comprise a rigid plate 46 formed of nonmagnetic composition, one surface of which includes at least one opposing conductive coil 50 similar in design to the conductive coil 30 described for the vibrating diaphragm above. Such a coil would include first and second contacts 54 and 58 for enabling current flow through the opposing conductive coil 50 to thereby establish the required second magnetic field. This at least one opposing conductive coil 50 would be positioned on the rigid plate in a location which is juxtaposed to the at least one conductive coil 30 on the vibrating or movable diaphragm 34 to enable the at least one conductive coil 30 and the at least one opposing conductive coil 50 to cause respective magnetic fields from each coil to interact to develop the compression waves emitted from the diaphragm.

Figure 5:
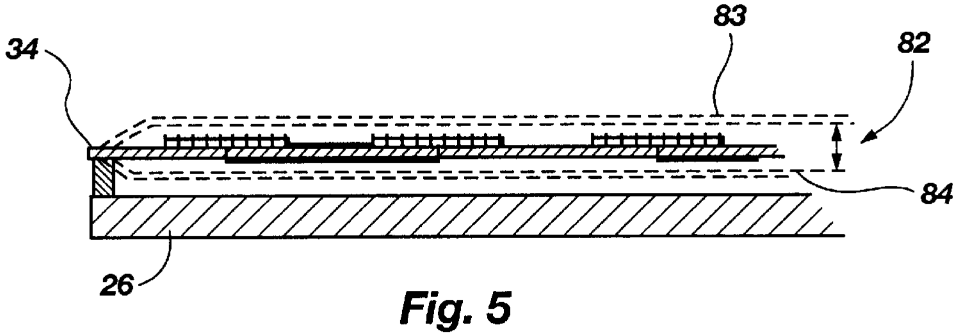
FIG. 5 is a cut-away profile view of the emitter diaphragm of FIG. 2, taken along the lines 5—5.

Hereagain, the first contact 54 is positioned on one side of the diaphragm and the second contact 58 is positioned on an opposing side of the diaphragm. This may be in the form of a single coil as illustrated in FIG. 3, or as a plurality of conductive coils equally spaced along the diaphragm as depicted in FIG. 2. Ideally, the conductive coils 30 and 50 are disposed in a plurality of rows in juxtaposed position to maximize uniformity of the magnetic field, as well as the quantity of coil applied.

Where multiple coils are formed, it is possible to partially isolate each coil by providing a support perimeter in contact with the diaphragm around each of the conductive coils. One such technique is depicted in FIG. 5, wherein a grid configuration 62 defines a plurality of open displacement cavities 66 at a surface of the core member 70 adjacent to the diaphragm 74, each cavity being aligned with one of the conductive coils 78. These displacement cavities 66 are of equal dimension to conform to the equally spaced voice coils 78 which they respectively support.

The advantages of physically isolating the respective voice coils 78 include reduction in anomalies within the vibrating diaphragm 74 which could arise from variations in physical properties of the film or diaphragm, as well as electrical properties which might propagate between coils from hysteresis or other forms of magnetic coupling that might be amplified by uninhibited transmission of vibrations between coil sectors. The supporting grid members operate to dampen such vibration where the diaphragm 74 is biased in contact with the grid face or edge surface. In this sense, each grid and coil sector becomes an autonomous speaker element which is controlled by the applied voltage through the coil. Where the voltage source is common and the coil elements are congruent, the output should be equal. Consequently, all coil sectors having common output will generate a uniform wave front substantially free of distortion arising from physical or electrical perturbations.

Physical distortion can be further minimized by ensuring that the film material is uniform or isotropic in its response characteristics. In this manner, elongation or stretching of the material in response to attraction or repulsion remains uniform across the array of coils. This response can also be affected by maintaining sufficient thickness in the film to reduce elongation to near zero. Vibration response is then limited to the actual displacement 82 of the film 34 between extreme positions of convex extension 83 to concave retraction 84 as illustrated in FIG. 5. In contrast with an electrostatic system wherein the force of electrostatic charges may be insufficient to fully displace the supporting film, the voice coils 30 supply additional mass and magnetic force to give greater extension and retraction.

As was indicated above, a voltage or control source is required as a means for supplying variable current flow to control current flow to the at least one conductive coil 30 and/or the at least one opposing conductive coil 50 where utilized. This is necessary to ensure that each coil generates a variable magnetic field which is capable of enhancing the desired repulsion and attraction arising between the respective coils. Where the core 26 comprises a permanent electromagnetic composition, the control source need only supply a voltage to voice coils 30 disposed on the vibrating film or diaphragm 34. Obviously, if the core 26 does not provide a permanent form of magnetic field, a voltage supply source would have to be applied to develop an electromagnetic force at the core which is operable with respect to the at least one conductive coil 30 to develop the desired diaphragm 34 displacement.

Figure 6:
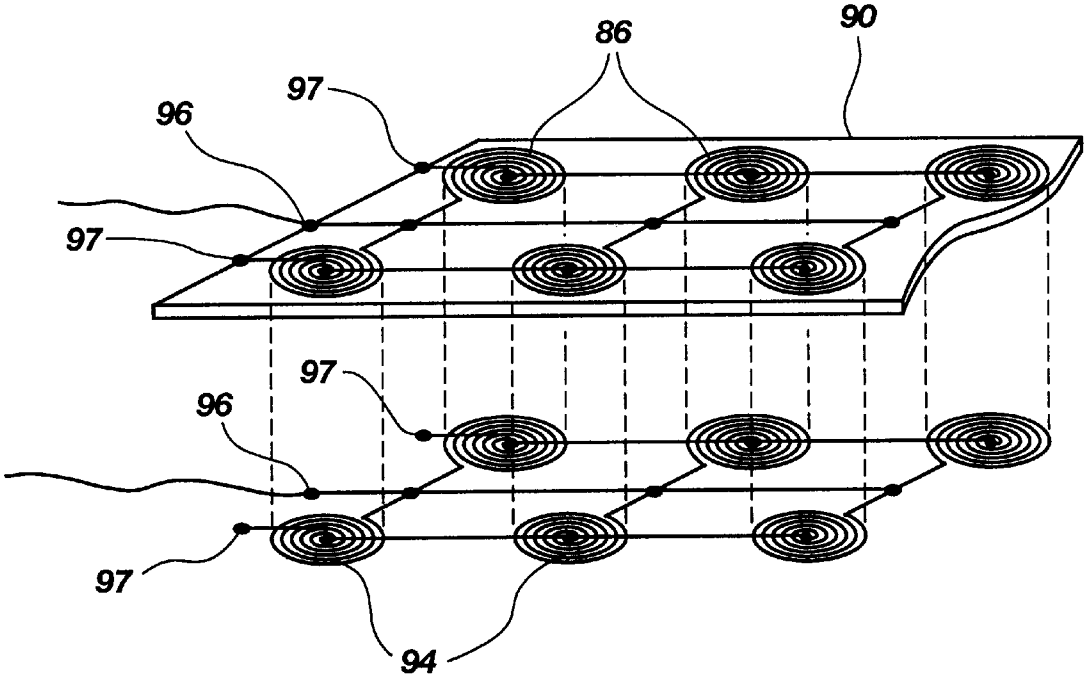
FIG. 6 is a cut-away profile view of an alternative embodiment wherein the emitter diaphragm includes additional magnetic coils disposed on an opposing side of the diaphragm.

FIG. 6 illustrates the use of a plurality of conductive coils 86 on the diaphragm 90 and a corresponding plurality of conductive coils 94 juxtaposed on an opposing side of the diaphragm 90 to further enhance the secondary magnetic force field generated at the diaphragm. In essence, the film (or diaphragm 90) is modified on both sides with opposing voice coils which could be activated from common contact points 96 & 97. Both sets of coils (86 and 87) would be powered by the same voltage source to generate common magnetic fields. These fields would be of equal polarity and would commonly reinforce each other.

The present invention enables a method for emitting a broad frequency range including ultrasonic frequencies utilizing a magnetically activated diaphragm or film comparable to an electrostatic diaphragm. The method offers increased audio amplitude because of a greatly enhanced capacity for relatively large diaphragm displacement as compared to lesser movement of a typical electrostatic diaphragm. This method comprises the basic steps of (i) providing a first magnetic field adjacent a supporting core member 26; (ii) applying at least one conductive coil 30 to a movable diaphragm 34 stretched along the core member and displaced a short separation distance from the core member to allow an intended range of orthogonal displacement of the diaphragm with respect to the core member and within a strong portion of the first magnetic field; (iii) and supplying variable current flow to the at least one coil 30 for developing a second magnetic field which variably interacts with the first magnetic field to attract and repel the diaphragm at a desired frequency for development of a series of compression waves which may be adjusted to include an ultrasonic frequency range. It will be noted that many of the variations discussed above can be implemented within the subject method in procedures that will be readily apparent to those skilled in the art. Accordingly, further expansion of specific method steps on alternative embodiments is deemed unnecessary.

Figure 4:
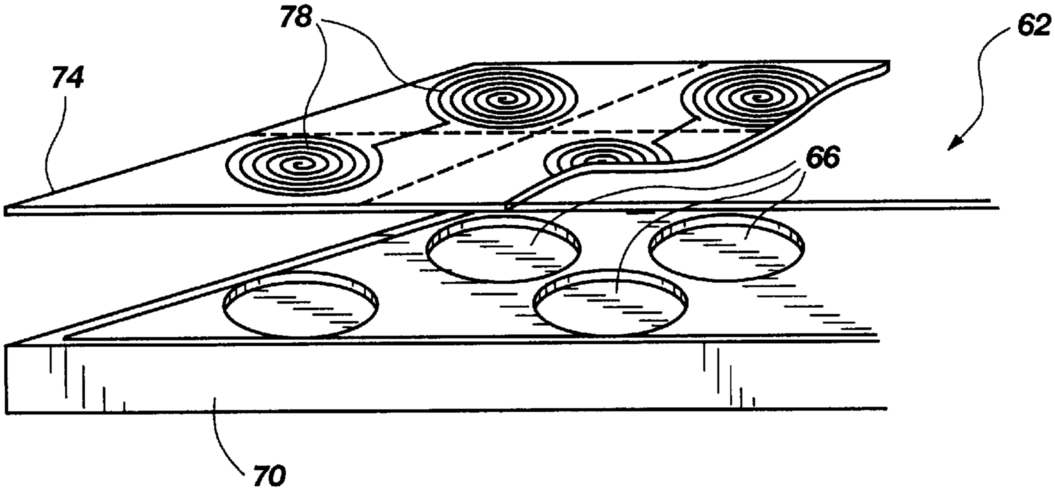
FIG. 4 is a graphic, elevational perspective view of a preferred embodiment of the present invention showing an emitter membrane disposed above a compartmentalized magnetic core.

Regarding both the apparatus and method set forth above, it will be further apparent to those skilled in the art that certain basic design considerations will deserve attention in developing specific configurations for various voice coil systems. For example, the embodiment of FIG. 4 requires consideration of resonant frequency as a function of various characteristics of the vibrating diaphragm and core structure. These characteristics include, among other things, the thickness of the film 74 stretched across the support core 70, as well as the diameter of the grid cavities 62 in the core structure. Using a thinner film 74 will obviously result in more rapid vibrations of the film 74 for a given applied voltage. Consequently, the resonant frequency of the film 74 (or diaphragm) will be higher.

Figure 7:
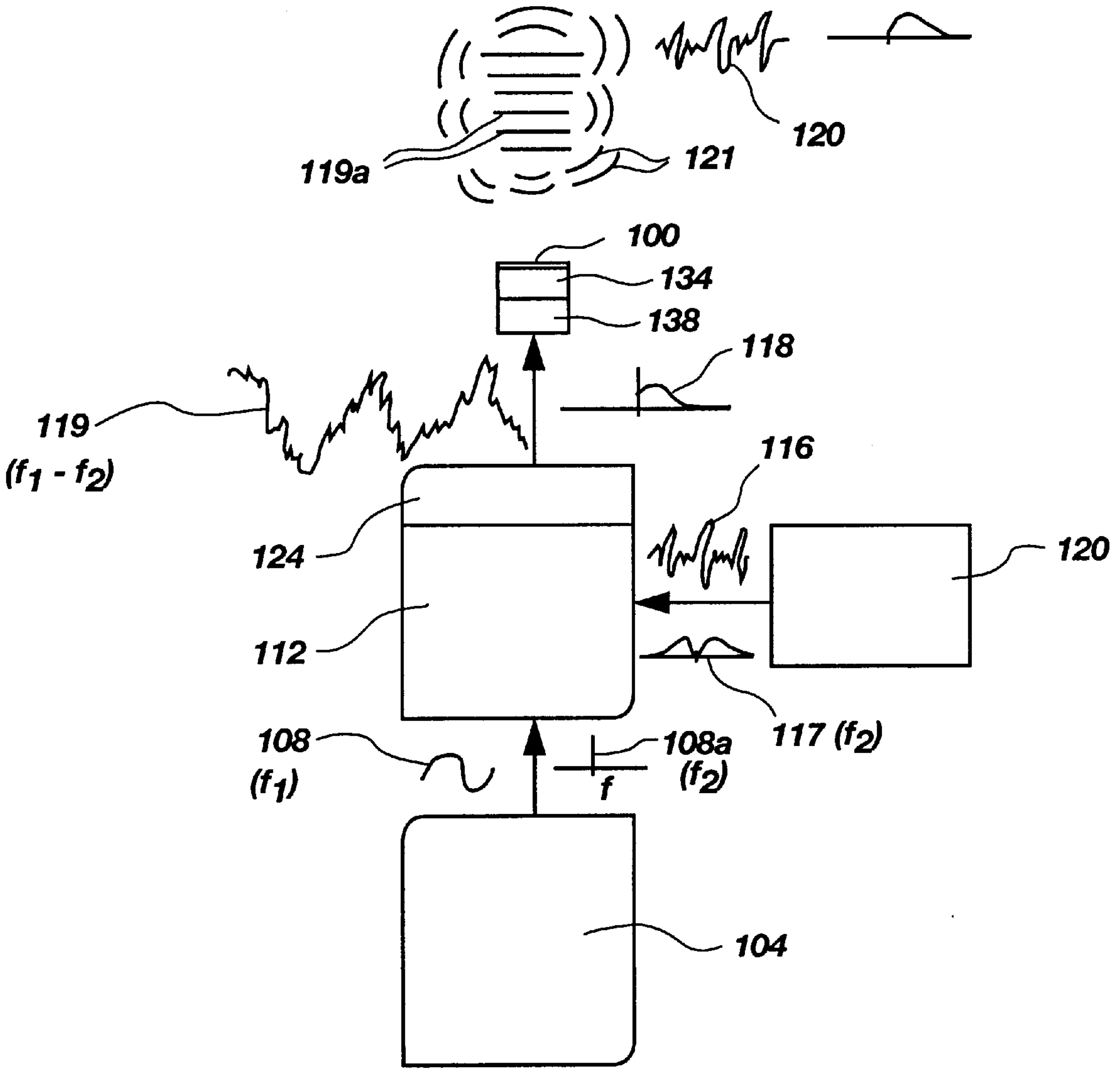
FIG. 7 is a more specific implementation of the present invention which transmits an ultrasonic base frequency and an ultrasonic intelligence carrying frequency which acoustically heterodyne to generate a new sonic or subsonic frequency.

Turning to a more specific implementation of the preferred embodiment of the present invention as part of a parametric system, a magnetic diaphragm 100 can be included in the system shown in FIG. 7 supported on a driver unit 138. This application utilizes a parametric or heterodyning technology, which is particularly adapted for the present thin film structure. The thin magnetic film of the present invention is well suited for operation at high ultrasonic frequencies in accordance with parametric speaker theory.

A basic system includes an oscillator or digital ultrasonic wave source 104 for providing a base or carrier wave 108. This wave 108 is generally referred to as a first ultrasonic wave or primary wave. An amplitude modulating component 112 is coupled to the output of the ultrasonic generator 104 and receives the base frequency 108 for mixing with a sonic or subsonic input signal 116. The sonic or subsonic signal 116 may be supplied in either analog or digital form, and could be music from any convention signal source 120 or other form of sound. If the input signal 116 includes upper and lower sidebands 117, a filter component 124 may be included in the modulator to yield a single sideband output 118 on the modulated carrier frequency for selected bandwidths (collectively identified as signal 119).

The magnetic diaphragm 100 is caused to emit the ultrasonic frequencies $f_1$ and $f_2$ as a new wave form *119a* propagated at the face of the magnetic diaphragm 100. This new wave form interacts within the nonlinear medium of air 121 to generate the difference frequency 120, as a new sonic or subsonic wave. The ability to have large quantities of emitter elements formed in an emitter disk is particularly well suited for generation of a uniform wave front which can propagate quality audio output at meaningful volumes.

The present invention is able to function as described because the compression waves corresponding to $f_1$ and $f_2$ interfere in air according to the principles of acoustical heterodyning. Acoustical heterodyning is somewhat of a mechanical counterpart to the electrical heterodyning effect which takes place in a non-linear circuit. For example, amplitude modulation in an electrical circuit is a heterodyning process. The heterodyne process itself is simply the creation of two new waves. The new waves are the sum and the difference of two fundamental waves.

In acoustical heterodyning, the new waves equaling the sum and difference of the fundamental waves are observed to occur when at least two ultrasonic signals interact or interfere in air. The preferred transmission medium of the present invention is air because it is a highly compressible medium that responds non-linearly under different conditions. This non-linearity of air enables the heterodyning process to take place, decoupling the difference signal from the ultrasonic output. However, it should be remembered that any compressible fluid can function as the transmission medium if desired.

Whereas successful generation of a parametric difference wave in the prior art appears to have had only nominal volume, the present configuration generates full sound. This full sound is enhanced to impressive volume levels by use of magnetic forces to displace the emitter diaphragm, rather than shorter range, electrostatic forces.

An important feature of the present invention is that the base frequency and single or double sidebands are propagated from the same transducer face. Therefore the component waves are perfectly collimated. Furthermore, phase alignment is at maximum, providing the highest level of interference possible between two different ultrasonic frequencies. With maximum interference insured between these waves, one achieves the greatest energy transfer to the air molecules, which effectively become the "speaker" radiating element in a parametric speaker. Accordingly, the inventor believes the enhancement of these factors within a thin film, ultrasonic emitter array as provided in the present invention has developed a surprising increase in volume to the audio output signal.

The development of full volume capacity in a parametric speaker provides significant advantages over conventional speaker systems. Most important is the fact that sound is reproduced from a relatively massless radiating element, as compared to conventional magnetic speakers. Specifically, there is no radiating element operating within the audio range because the film is vibrating at ultrasonic frequencies. This feature of sound generation by acoustical heterodyning can substantially eliminate distortion effects, most of which are caused by the excessive mass of the radiating element of a conventional speaker. For example, adverse harmonics and standing waves on the loudspeaker cone, cone overshoot and cone undershoot are substantially eliminated because the low mass, thin film is traversing distances in micrometers.

In general, it should be noted that this aspect of the present invention means that technology is now approaching the final step of achieving truly pure sound reproduction. Distortion free sound implies that the present invention maintains phase coherency relative to the originally recorded sound. Conventional speaker systems do not have this capacity because the frequency spectrum is broken apart by a cross-over network for propagation by the most suitable speaker element (woofer, midrange or tweeter). By eliminating the radiating element, the present invention obsoletes the conventional cross-over network frequency and phase controls.

It should also be apparent from the description above that the preferred and alternative embodiments can emit sonic frequencies directly, without having to resort to the acoustical heterodyning process described earlier. However, the range of frequencies in the audible spectrum is necessarily limited to generally higher frequencies, as the invention is unable to generate low or subsonic frequencies. Therefore, the greatest advantages of the present invention are realized when the invention is used to generate the entire range of audible frequencies indirectly using acoustical heterodyning as explained above.

It is to be understood that the above-described embodiments are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed and desired to be secured by United States Letters Patent is:

1. An ultrasonic emitter device having broad frequency range capacity with relatively large diaphragm displacement compared to typical electrostatic diaphragm movement, said device comprising:

a core member having means for establishing a first magnetic field adjacent the core member;

a movable diaphragm extending along the core member and displaced a short separation distance from the core member to allow an intended range of orthogonal displacement of the diaphragm with respect to the core member and within a strong portion of the first magnetic field;

at least one, low mass, planar, conductive coil disposed on the movable diaphragm and including first and second contacts for enabling current flow through opposing ends of the coil; and means for supplying variable current flow to the at least one coil for developing a second magnetic field which variably interacts with the first magnetic field to attract and repel the diaphragm at a desired frequency for development of a series of compression waves which may be adjusted to include an ultrasonic frequency range.

2. A device as defined in claim 1, wherein the core member comprises a permanent magnet.

3. A device as defined in claim 2, wherein the permanent magnet comprises a rigid plate of magnetic material having dimensions slightly larger than dimensions of an active emitting surface of the emitter device.

4. A device as defined in claim 3, wherein the rigid plate comprises a flat plate with uniform magnetic field along a surface of the plate most adjacent the movable diaphragm.

5. A device as defined in claim 2, wherein the permanent magnet comprises a flexible magnetic plate.

6. A device as defined in claim 1, wherein the core member comprises a rigid plate formed of nonmagnetic composition, one surface of the plate including at least one opposing conductive coil having first and second contacts for enabling current flow through the opposing conductive coil.

7. A device as defined in claim 6, wherein the at least one opposing conductive coil is positioned on the rigid plate in a location which is juxtaposed to the at least one conductive coil on the movable diaphragm to enable the at least one conductive coil and at least one opposing conductive coil to cause respective magnetic fields from each coil to interact to develop the compression waves.

8. A device as defined in claim 7, wherein the means for supplying variable current flow includes control means for coordinating current flow to the at least one conductive coil and the at least one opposing conductive coil to provide such that each coil generates a variable magnetic field which is capable of enhancing repulsion and attraction arising between the respective coils.

9. A device as defined in claim 1, wherein the diaphragm comprises a thin film, said at least one coil being disposed on one side of the film.

10. A device as defined in claim 9, wherein the film comprises a polymer having isotropic properties across its surface to provide a uniform response to applied tension.

11. A device as defined in claim 10, wherein the polymer comprises Mylar®.

12. A device as defined in claim 9, wherein the film includes width and length dimensions including at least a two inch diameter.

13. A device as defined in claim 1, wherein the coil is deposited on the diaphragm as a conductive element, said first contact being positioned on one side of the diaphragm and the second contact being positioned on an opposing side of the diaphragm.

14. A device as defined in claim 1, comprising a plurality of conductive coils disposed on the diaphragm.

15. A device as defined in claim 14, wherein the plurality of conductive coils are equally spaced along the diaphragm.

16. A device as defined in claim 15, wherein the plurality of conductive coils are disposed in a plurality of rows.

17. A device as defined in claim 1, further comprising a support perimeter in contact with the diaphragm around each at least one conductive coil.

18. A device as defined in claim 17, comprising a plurality of voice coils, each voice coil including a support perimeter in contact with the diaphragm and providing means for substantially isolating displacement of the diaphragm at each coil from adjacent coils.

19. A device as defined in claim 18, wherein the support perimeter for isolating the coils comprises a grid configuration defining a plurality of open displacement cavities at a surface of the core member adjacent to the diaphragm, each cavity being aligned with one of the conductive coils.

20. A device as defined in claim 19, wherein the displacement cavities are of equal circular dimension.

21. A device as defined in claim 19, wherein the core comprises a permanent magnet having a magnetic field strength selected to provide a biasing force on the diaphragm based on the magnetic field developed within the at least one conductive coil.

22. A device as defined in claim 1, wherein the core comprises an electromagnetic composition and includes means for supplying a voltage for developing an electromagnetic force at the core which is operable with respect to the at least one conductive coil to develop the desired diaphragm displacement.

23. A device as defined in claim 22, wherein a plurality of conductive coils are disposed on the diaphragm and develop a collective response to the electromagnetic force of the core to generate the desired relatively large diaphragm displacement.

24. A device as defined in claim 1, wherein the means for establishing the first magnetic field adjacent the core comprises an opposing at least one conductive coil positioned on the core adjacent the at least one conductive coil of the diaphragm.

25. A device as defined in claim 1, comprising a plurality of conductive coils on the diaphragm and a corresponding plurality of conductive coils juxtaposed to the conductive coils on an opposing side of the diaphragm.

26. A device as defined in claim 24, wherein the means for providing the first magnetic field comprises a variable current flow to the at least one coil at the core in a phase inverted relationship with the variable current applied to develop the second magnetic field to thereby enhance the attraction and repulsion of the diaphragm for development of a series of compression waves which may be adjusted to include the ultrasonic frequency range.

27. A device as defined in claim 26, wherein the plurality of coils of the core are aligned with the plurality of coils of the diaphragm.

28. A method for emitting a broad frequency range including ultrasonic frequencies, yet having a capacity for relatively large diaphragm displacement as compared to lesser movement of a typical electrostatic diaphragm movement, the method comprising the steps of:

(a) providing a first magnetic field adjacent a supporting core member;

(b) applying at least one conductive coil to a movable diaphragm extending along the core member and displaced a short separation distance from the core member to allow an intended range of orthogonal displacement of the diaphragm with respect to the core member and within a strong portion of the first magnetic field; and (c) supplying variable current flow to the at least one coil for developing a second magnetic field which variably interacts with the first magnetic field to attract and repel the diaphragm at a desired frequency for development of a series of compression waves which may be adjusted to include an ultrasonic frequency range.

* * * * *